(12) United States Patent
Wang (10) Patent No.: US 9,475,516 B1
(45) Date of Patent: Oct. 25, 2016

(54) FOLDING DEVICE FOR BABY CARRIAGE

(71) Applicant: Kun Wang, Taichung (TW)

(72) Inventor: Kun Wang, Taichung (TW)

( * ) Notice: Subject to any disclaimer, the term of this patent is extended or adjusted under 35 U.S.C. 154(b) by 0 days.

(21) Appl. No.: 15/007,707

(22) Filed: Jan. 27, 2016

(51) Int. Cl.
  *B62B 1/00* (2006.01)
  *B62B 7/06* (2006.01)
  *B62B 7/10* (2006.01)

(52) U.S. Cl.
  CPC ........ *B62B 7/062* (2013.01); *B62B 7/10* (2013.01)

(58) Field of Classification Search
  CPC ........... B62B 7/06; B62B 7/062; B62B 7/08; B62B 7/008; B62B 3/12
  See application file for complete search history.

(56) References Cited

U.S. PATENT DOCUMENTS

| | | | | |
|---|---|---|---|---|
| 5,845,924 A * | 12/1998 | Huang | ...................... | B62B 7/06 280/47.36 |
| 6,991,248 B2 * | 1/2006 | Valdez | ...................... | B62B 7/08 280/642 |
| 7,237,795 B2 * | 7/2007 | Wu | ...................... | B62B 3/12 280/651 |
| 7,632,035 B2 * | 12/2009 | Cheng | ...................... | B62B 7/008 280/642 |
| 9,216,755 B2 * | 12/2015 | Eisinger | ...................... | B62B 7/06 |
| 9,399,477 B2 * | 7/2016 | Iftinca | ...................... | B62B 7/06 |
| 2011/0084467 A1 * | 4/2011 | Liao | ...................... | B62B 7/062 280/642 |
| 2011/0181024 A1 * | 7/2011 | Chicca | ...................... | B62B 7/062 280/642 |

\* cited by examiner

*Primary Examiner* — Hau Phan
(74) *Attorney, Agent, or Firm* — Ming Chow; Sinorica, LLC (57) ABSTRACT

A folding device for baby carriage has two folding groups. Each folding group has a front leg mount, a rear leg mount, and a grip mount. The front leg mount has a front mounting segment, two connecting segments formed on the front mounting segment at a spaced interval, and a receiving space formed between the connecting segments. The rear leg mount is pivotally connected to the front leg mount and has a rear mounting segment, a pivotal segment, and a connecting arm. The pivotal segment is formed on the rear mounting segment, is inserted into the receiving space, and has a pivot recess, multiple pivot boards, multiple elongated slots, and an engaging recess. The grip mount is pivotally connected to the front leg mount and the rear leg mount, and has an upper mounting segment, a linking segment, a through slot, and an engaging stem.

12 Claims, 8 Drawing Sheets

FOLDING DEVICE FOR BABY CARRIAGE

BACKGROUND OF THE INVENTION

1. Field of the Invention

The present invention relates to a folding device, and more particularly to a folding device for baby carriage that has a simple structure, low cost and may be operated conveniently.

2. Description of Related Art

A conventional baby carriage can be folded to reduce the volume of the conventional baby carriage for ease and convenience in transporting and storage. The conventional baby carriage has a main frame and a baby seat. The main frame has a bottom base, a hand grip, and a folding device. The folding device is connected to the bottom base and the hand grip. The baby seat is detachably mounted on the main frame between the bottom base and the hand grip. In use, the folding device is folded to enable the bottom base and the hand grip to rotate to reduce the volume of the conventional baby carriage.

However, the folding device of the conventional baby carriage may provide a folding effect to the conventional baby carriage to reduce the volume of the conventional baby carriage. The folding device of the conventional baby carriage has multiple components with complex structure, and this may increase the cost of assembly and use. Furthermore, during the folding process, the conventional baby carriage requires several steps of folding, and this is inconvenient in use. Additionally, a user's fingers may get injured by the folding device of the conventional baby carriage during the folding process.

To overcome the shortcomings, the present invention provides a folding device to mitigate or obviate the aforementioned problems.

SUMMARY OF THE INVENTION

The main objective of the present invention is to provide a folding device for baby carriage that has a simple structure, low cost and may be operated conveniently.

The folding device for baby carriage in accordance with the present invention has two folding groups. Each folding group has a front leg mount, a rear leg mount, and a grip mount. The front leg mount has a front mounting segment, two connecting segments formed on the front mounting segment at a spaced interval, and a receiving space formed between the connecting segments. The rear leg mount is pivotally connected to the front leg mount and has a rear mounting segment, a pivotal segment, and a connecting arm. The pivotal segment is formed on the rear mounting segment, is inserted into the receiving space, and has a pivot recess, multiple pivot boards, multiple elongated slots, and an engaging recess. The grip mount is pivotally connected to the front leg mount and the rear leg mount, and has an upper mounting segment, a linking segment, a through slot, and an engaging stem.

Other objectives, advantages and novel features of the invention will become more apparent from the following detailed description when taken in conjunction with the accompanying drawings.

DETAILED DESCRIPTION OF THE PREFERRED EMBODIMENT

With reference to FIGS. 1 to 3 and 3A, a folding device in accordance with the present invention may be connected to a baby carriage 60, and the baby carriage 60 has a bottom base 61 and a hand grip 62. The bottom base 61 has a front frame 63 and a rare frame 64. Each one of the frames 63, 64 is U-shaped. The hand grip 62 has two connecting pipes 621 and a pressing button 623. Each one of the connecting pipes 621 has a rope 622 mounted in the connecting pipe 621. The pressing button 623 is pressably mounted on a middle of the hand grip 62 and is connected to the ropes 622 of the connecting pipes 621. The pressing button 623 is conventional and the structures and operation of the pressing button are not described in detail.

The folding device is connected to the bottom base 61 and the hand grip 62 of the baby carriage 60, and has two folding groups 10. The folding groups 10 have the same structures, and each one of the folding groups 10 has a front leg mount 20, a rear leg mount 30, and a grip mount 40.

The front leg mount 20 is mounted around and connected to an end of the front frame 63 of the bottom base 61, and has a bottom, a top, a front mounting segment 21, two connecting segments 22, and a receiving space 23. The front mounting segment 21 is formed on the bottom of the front leg mount 20 and is mounted around the end of the front frame 63. The connecting segments 22 are formed on the front mounting segment 21 at a spaced interval on the top of the front leg mount 20. Furthermore, each one of the connecting segments 22 is a curved plate. The receiving space 23 is formed in the front leg mount 20 between the connecting segments 22 and communicates with the front mounting segment 21.

With reference to FIGS. 2, 3, 3A, and 4, the rear leg mount 30 is connected to an end of the rear frame 64 of the bottom base 61, and is pivotally connected to the front leg mount 20 to enable the front frame 63 to connect with the rear frame 64 via the front leg mount 20 and the rear leg mount 30. The rear leg mount 30 has a bottom, a top, a rear mounting segment 31, a pivotal segment 32, and a connecting arm 33. The rear mounting segment 31 is formed on the bottom of the rear leg mount 30, and is mounted around the end of the rear frame 64.

The pivotal segment 32 is formed on the rear mounting segment 31 on the top of the rear leg mount 30, is inserted into the receiving space 23 between the connecting segments 21, and has a top, an inner side, an outer side, a pivot recess 321, multiple pivot boards 322, multiple elongated slots 323, and an engaging recess 324. The top of the pivotal segment 32 is inserted into the receiving space 23 of the front leg mount 20. The inner side of the pivotal segment 32 faces the front mounting segment 21. The pivot recess 321 is triangular and is formed in the inner side of the pivotal segment 32. The pivot boards 322 are formed on and protrude from the top of the pivotal segment 32 at spaced intervals, are parallel with each other, and each one of the pivot boards 322 is a curved board. The elongated slots 323 are formed in the top of the pivotal segment 32 between the pivot boards 322 to enable each one of the elongated slots 323 to form between two adjacent pivot boards 322.

Additionally, the pivotal segment 32 may have three pivot boards 322 and two elongated slots 323 formed between the three pivot boards 322. Furthermore, each one of the elongated slots 323 has a width formed between two adjacent pivot boards 322, and the width of the elongated slot 323 is narrower than 5 millimeters or is wider than 12 millimeters. The engaging recess 324 is formed in the outer side of the pivotal segment 32 adjacent to the pivot boards 322.

The connecting arm 33 is mounted in the receiving space 23 of the front leg mount 20, is connected to the rear leg mount 30 and has two ends. One of the ends of the connecting arm 33 is mounted in the pivot recess 321 and is pivotally connected to the pivotal segment 32, and the other one end of the connecting arm 33 is pivotally connected to the front mounting segment 21 of the front leg mount 20 to pivotally connect the rear leg mount 30 with the front leg mount 20.

The grip mount 40 is pivotally connected to the front leg mount 20 and the rear leg mount 30, is connected to an end of the hand grip 62, and has a top, an upper mounting segment 41, a linking segment 42, a through slot 43, and an engaging stem 44. The upper mounting segment 41 is formed on the top of the grip mount 40, is mounted around one of the connecting pipes 621 of the hand grip 62 and has a bottom side.

The linking segment 42 is formed on and protrudes from the bottom side of the upper mounting segment 41, is inserted into the receiving space 23 of the front leg mount 20, and is connected to the pivotal segment 32 and the connecting segments 22. The linking segment 42 has a bottom end and multiple linking boards 421. The bottom end of the linking segment 42 is opposite to the upper mounting segment 41. The linking boards 421 are formed on and protrude from the bottom end of the linking segment 42 at spaced intervals, and are respectively extended into the elongated slots 323 of the pivotal segment 32, and are pivotally connected to the pivot boards 322. That is, each one of the linking boards 421 is extended into one of the elongated slots 323 between two adjacent pivot boards 322, and is pivotally connected to the two adjacent pivot boards 322. Furthermore, each one of the linking boards 421 is a curved board. Then, the grip mount 40 may pivotally rotate relative to the front leg mount 20 and the rear leg mount 30. In addition, the linking segment 42 has two linking boards 421 respectively inserted into the two elongated slots 323 of the pivotal segment 32.

The through slot 43 is formed through the upper mounting segment 41 and the linking segment 42 and communicates with the engaging recess 324 of the pivotal segment 32. The engaging stem 44 is mounted between the upper mounting segment 41, the linking segment 42, and one of the connecting pipes 621, is connected to the rope 622 mounted in the corresponding connecting pipe 621 and has an engaging end 441. The engaging end 441 of the engaging stem 44 is opposite to the corresponding rope 622 and selectively engages with the engaging recess 324 of the pivotal segment 32 via the through slot 43.

Figure 5:
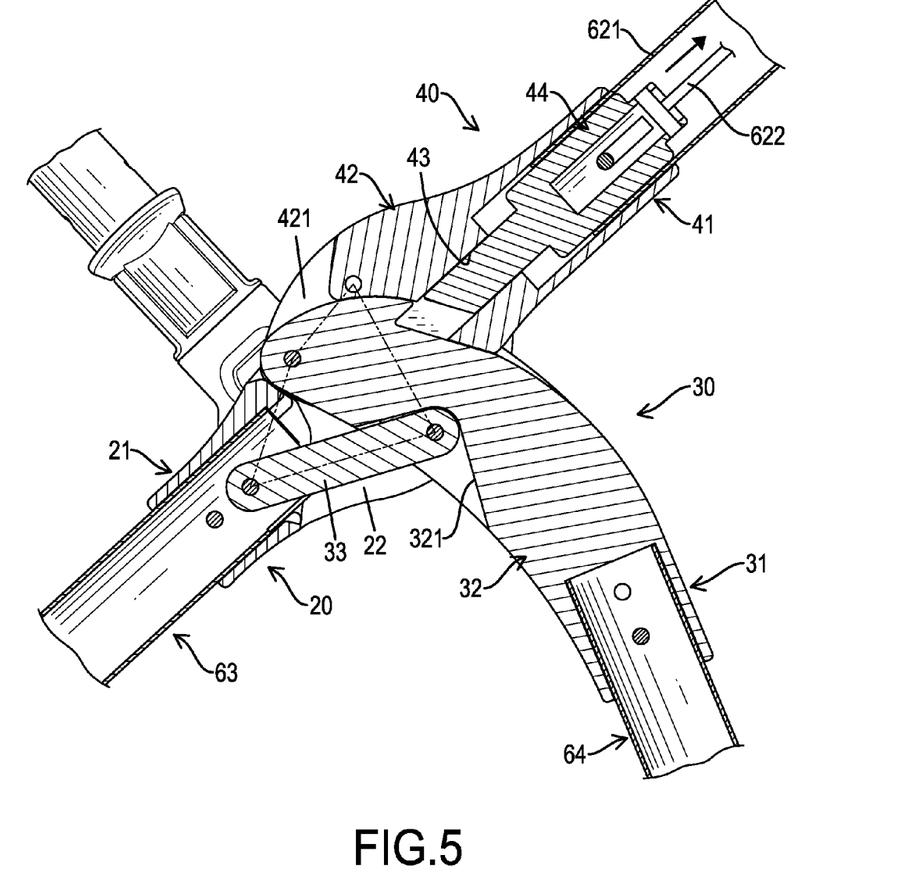
FIGS. 5 to 7 are operational and cross sectional side views of the folding device in FIG. 2.

With reference to FIG. 5, the two ends of the connecting arm 33, a pivot point between the linking segment 42 and the connecting segments 22, and a pivot point between the pivot boards 322 and the linking boards 421 form a four bar linkage mechanism as shown by the dotted lines, and this may enable the rear leg mount 30 and the grip mount 40 to rotate relative to the front leg mount 20.

Figure 1:
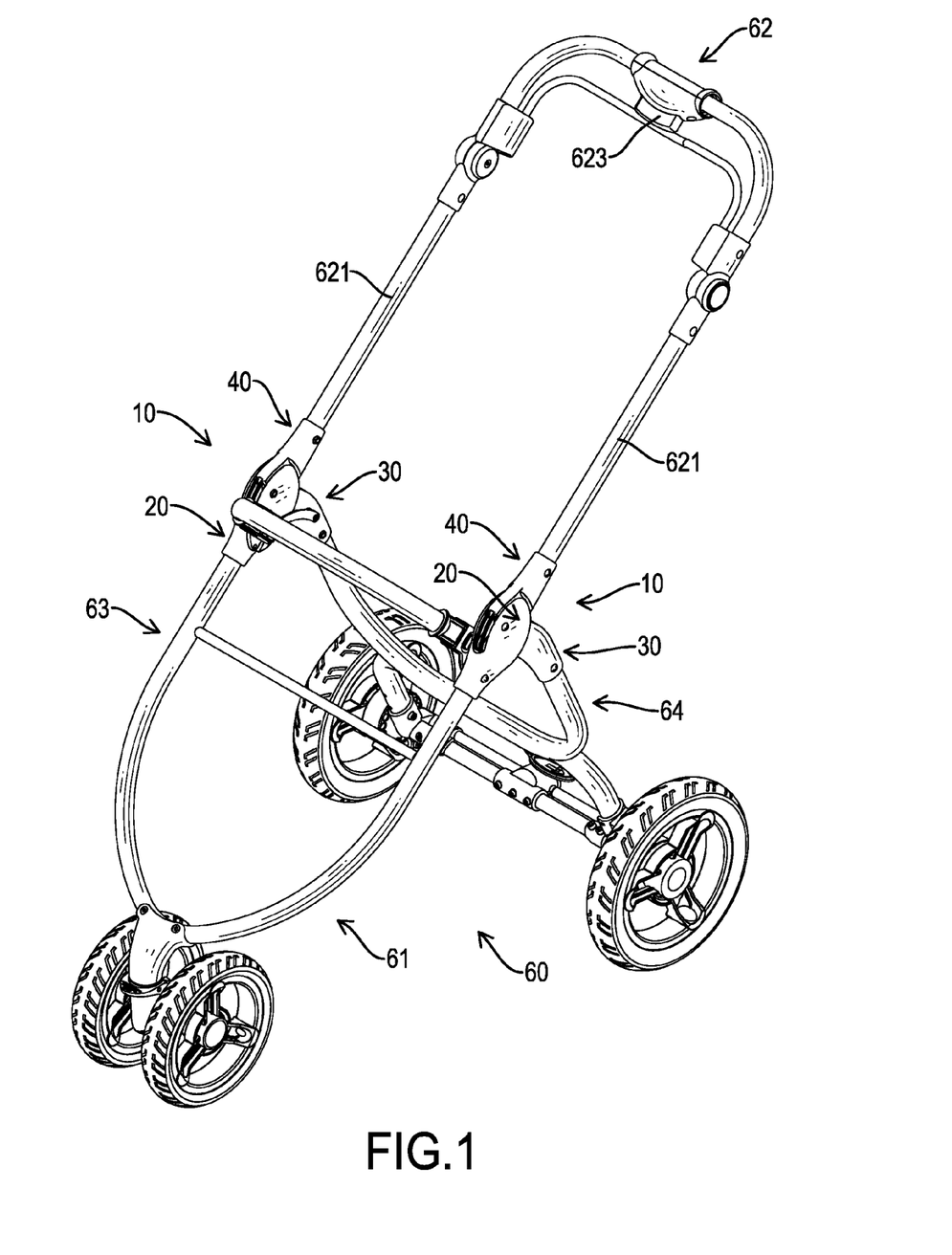
FIG. 1 is a perspective view of a folding device in accordance with the present invention in an unfolded condition, connected to a baby carriage.
Figure 2:
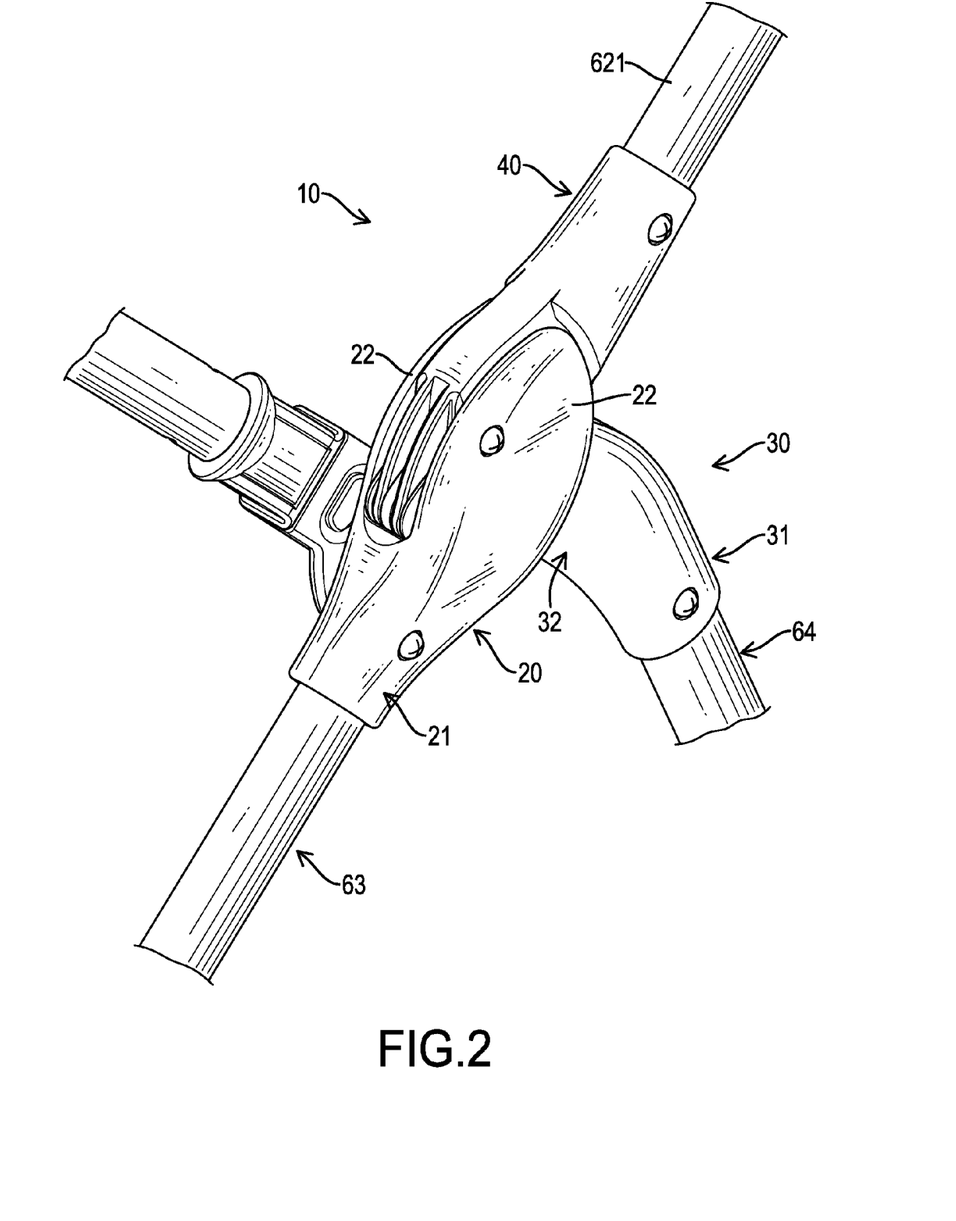
FIG. 2 is an enlarged perspective view of the folding device in FIG. 1.
Figures 3, 3A:
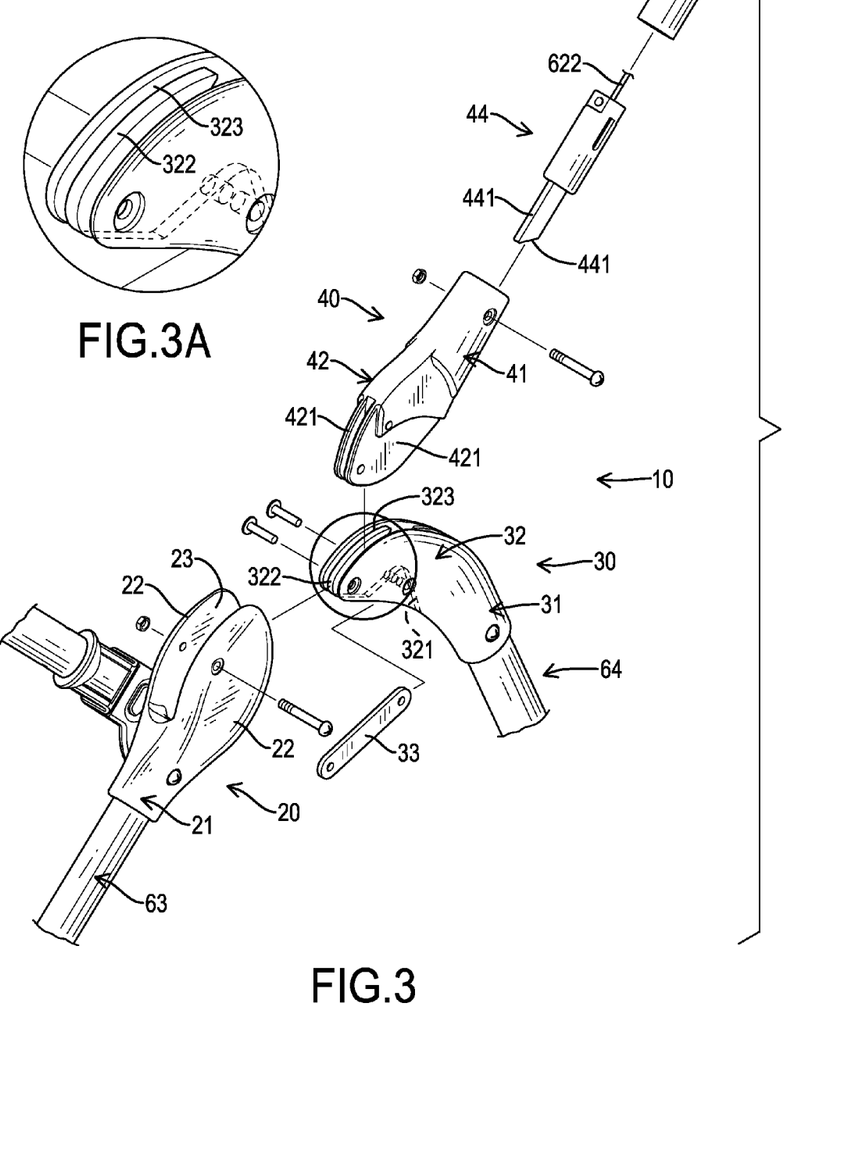
FIG. 3 is an exploded perspective view of the folding device in FIG. 2.
FIG. 3A is an enlarged perspective view of the folding device in FIG. 3.
Figure 4:
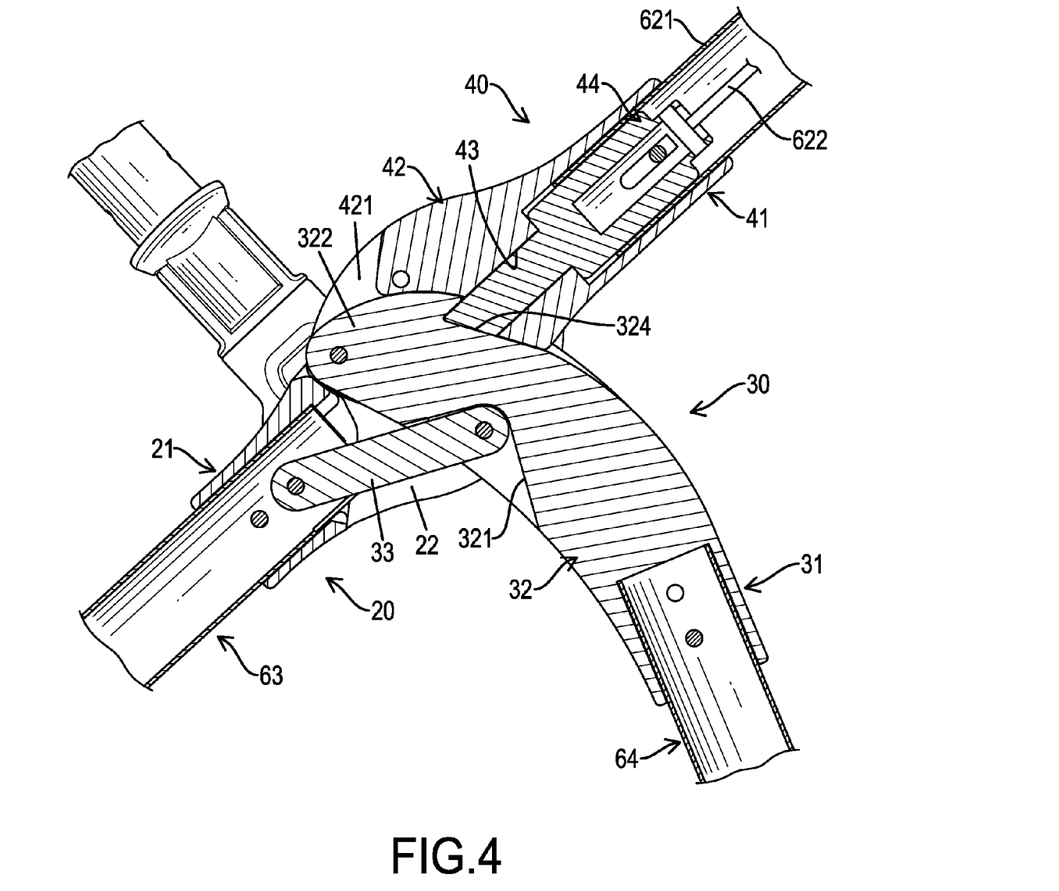
FIG. 4 is cross sectional side view of the folding device in FIG. 2.
Figure 6:
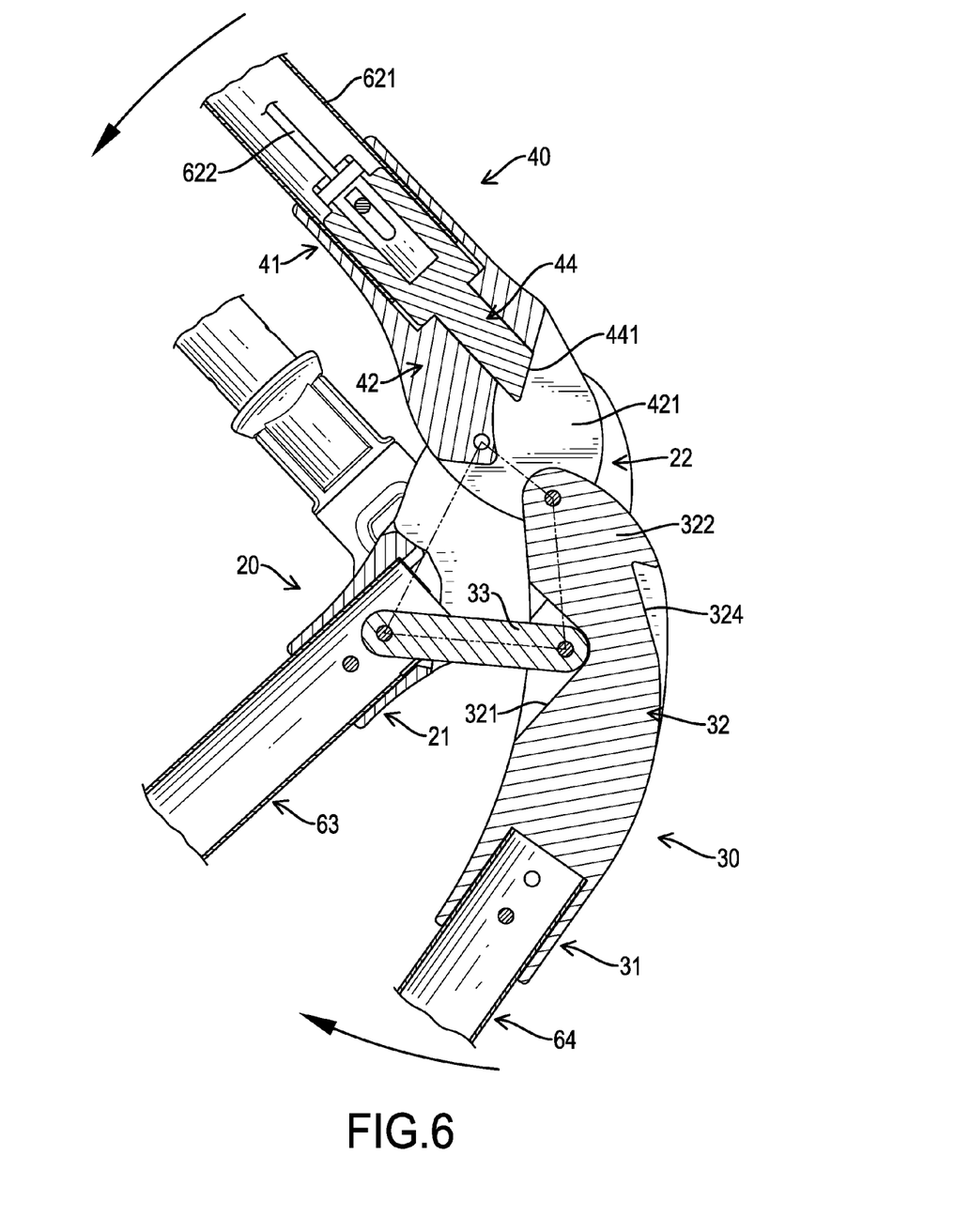

With reference to FIG. 1, when the baby carriage 60 is to be folded for storage, a user may press the pressing button 623 to enable the ropes 622 to move toward the middle of the hand grip 62 along the connecting pipes 621. Then, the engaging stems 44 of the two folding groups 10 are pulled upwardly relative to the two connecting pipes 621 and the linking segments 42 by the ropes 622 as shown in FIG. 5. Then, the engaging ends 441 of the engaging stems 44 disengage from the engaging recesses 324 of the pivotal segments 32. With reference to FIG. 6, in each one of the folding groups 10, the pivotal segment 32 of the rear leg mount 30 and the linking segment 42 of the grip mount 40 may rotate relative to the connecting segments 22 of the front leg mount 20. The rear mounting segment 31 of the rear leg mount 30 and the upper mounting segment 41 of the grip mount 40 are moved toward the front mounting segment 21 of the front leg mount 20. During the above-mentioned rotation process, the connecting arm 33 may prevent the rear leg mount 30 separating from the front leg mount 20, and the connecting arm 33 is swung in the pivot recess 321.

Figure 7:
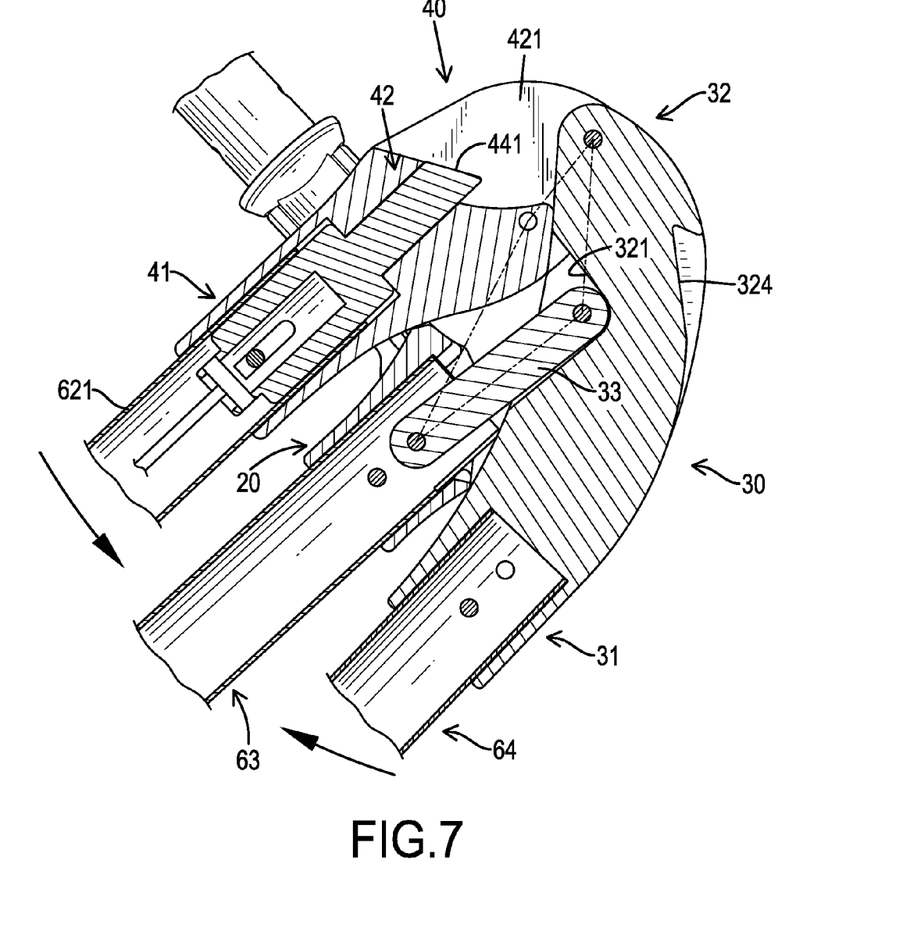
Figure 8:
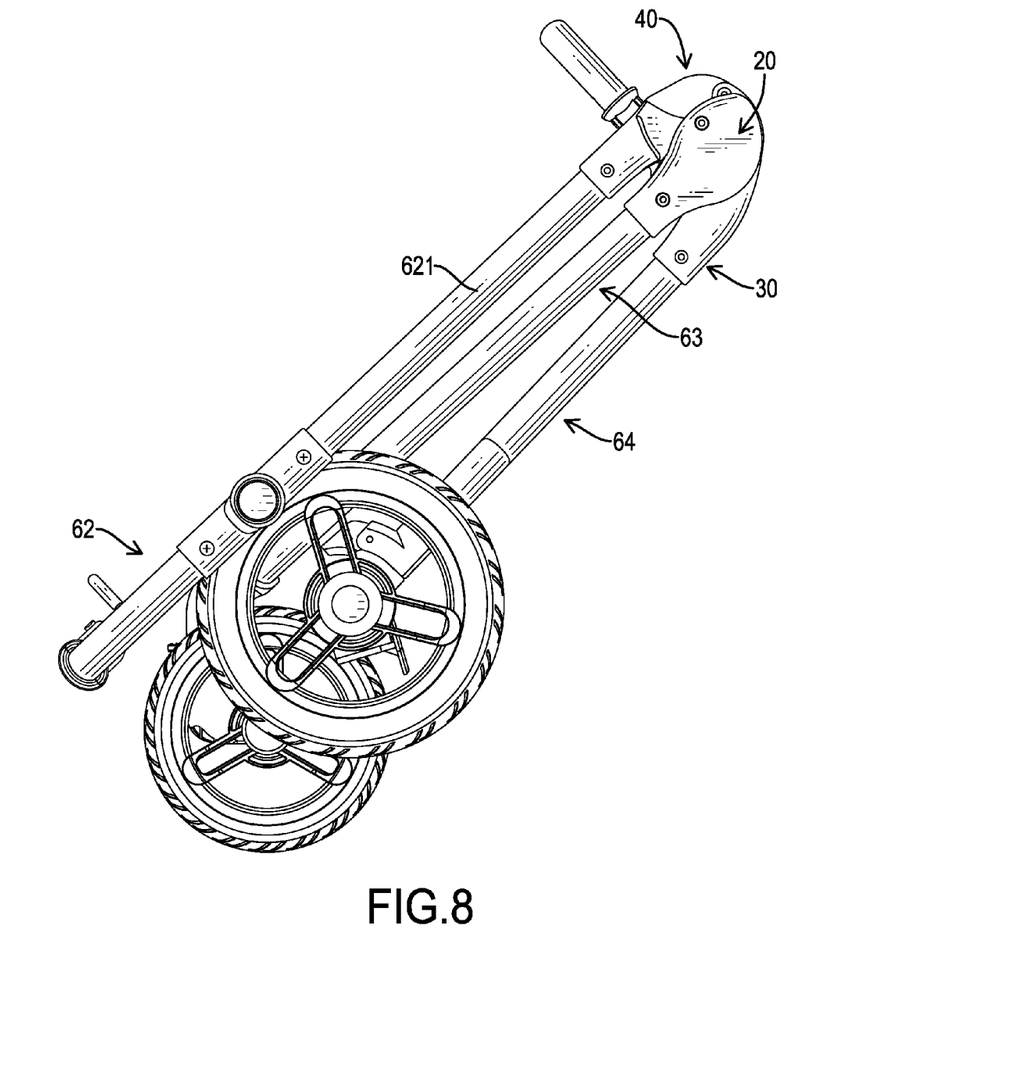
FIG. 8 is a perspective view of the folding device in accordance with the present invention in a folded condition, connected to the baby carriage.

With reference to FIG. 7, when the connecting segment 22 of the grip mount 40 faces and abuts the inner side of the pivotal segment 32, the baby carriage 60 is operated in a folded condition as shown in FIG. 8. Therefore, the user only needs to press the pressing button 623 and rotate the rear leg mount 30 and the grip mount 40 relative to the front leg mount 20 by a single step as shown in FIGS. 5 to 7, and the baby carriage 60 is folded easily and smoothly to reduce the volume of the baby carriage 60 for storage and transport conveniently.

In addition, with reference to FIG. 6, during the folding process of the baby carriage 60, the rear leg mount 30 and the grip mount 40 are rotated relative to the front leg mount 20, when the user's fingers are inserted between the rear leg mount 30 and the grip mount 40, the user's fingers may not get injured during the folding process since the pivot boards 322 and the linking boards 421 are curved.

Furthermore, the width of each one of the elongated slots 323 is narrower than 5 millimeters or wider than 12 millimeters, and this may prevent the user's fingers from inserting into or getting stuck by the elongated slots 323. Therefore, the folding device in the present invention has a simple structure to reduce the cost of assembly and use, and may be operated to fold or unfold conveniently and easily.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A folding device for baby carriage having two folding groups, and each one of the folding groups having
   a front leg mount having
      a bottom;
      a top;
      a front mounting segment formed on the bottom of the front leg mount;

two connecting segments formed on the front mounting segment at a spaced interval on the top of the front leg mount; and a receiving space formed in the front leg mount between the connecting segments and communicating with the front mounting segment;

a rear leg mount pivotally connected to the front leg mount and having a bottom;

a top;

a rear mounting segment formed on the bottom of the rear leg mount;

a pivotal segment formed on the rear mounting segment on the top of the rear leg mount, inserted into the receiving space between the connecting segments, and having a top inserted into the receiving space of the front leg mount;

an inner side facing the front mounting segment;

an outer side;

a pivot recess formed in the inner side of the pivotal segment;

multiple pivot boards formed on and protruding from the top of the pivotal segment at spaced intervals and being parallel with each other;

multiple elongated slots formed in the top of the pivotal segment between the pivot boards to enable each one of the elongated slots to form between two adjacent pivot boards; and an engaging recess formed in the outer side of the pivotal segment adjacent to the pivot boards; and a connecting arm mounted in the receiving space of the front leg mount, connected to the rear leg mount and having two ends, one of the ends of the connecting arm mounted in the pivot recess and pivotally connected to the pivotal segment, and the other one end of the connecting arm pivotally connected to the front mounting segment of the front leg mount to pivotally connect the rear leg mount with the front leg mount; and a grip mount pivotally connected to the front leg mount and the rear leg mount, and having a top;

an upper mounting segment formed on the top of the grip mount and having a bottom side;

a linking segment formed on and protruding from the bottom side of the upper mounting segment, inserted into the receiving space of the front leg mount, connected to the pivotal segment and the connecting segments, and having a bottom end opposite to the upper mounting segment; and multiple linking boards formed on and protruding from the bottom end of the linking segment at spaced intervals, and respectively extended into the elongated slots of the pivotal segment, and pivotally connected to the pivot boards;

a through slot formed through the upper mounting segment and the linking segment and communicating with the engaging recess of the pivotal segment; and an engaging stem mounted between the upper mounting segment and the linking segment, and having an engaging end selectively engaging with the engaging recess of the pivotal segment via the through slot.

2. The folding device for baby carriage as claimed in claim 1, wherein each one of the folding groups has a four bar linkage mechanism formed between the two ends of the connecting arm, a pivot point between the linking segment and the connecting segments, and a pivot point between the pivot boards and the linking boards to enable the rear leg mount and the grip mount to rotate relative to the front leg mount.

3. The folding device for baby carriage as claimed in claim 2, wherein the pivotal segment of each one of the folding groups has three pivot boards; and two elongated slots formed between the three pivot boards; and the linking segment of each one of the folding groups has two linking boards respectively inserted into the two elongated slots of the pivotal segment.

4. The folding device for baby carriage as claimed in claim 3, wherein each one of the pivot boards of each folding group is a curved board; and each one of the linking boards of each folding group is a curved board.

5. The folding device for baby carriage as claimed in claim 4, wherein each one of the elongated slots of each folding group has a width formed between two adjacent pivot boards, and the width of the elongated slot is narrower than 5 millimeters.

6. The folding device for baby carriage as claimed in claim 4, wherein each one of the elongated slots of each folding group has a width formed between two adjacent pivot boards, and the width of the elongated slot is wider than 12 millimeters.

7. The folding device for baby carriage as claimed in claim 2, wherein each one of the pivot boards of each folding group is a curved board; and each one of the linking boards of each folding group is a curved board.

8. The folding device for baby carriage as claimed in claim 7, wherein each one of the elongated slots of each folding group has a width formed between two adjacent pivot boards, and the width of the elongated slot is narrower than 5 millimeters.

9. The folding device for baby carriage as claimed in claim 7, wherein each one of the elongated slots of each folding group has a width formed between two adjacent pivot boards, and the width of the elongated slot is wider than 12 millimeters.

10. The folding device for baby carriage as claimed in claim 1, wherein each one of the pivot boards of each folding group is a curved board; and each one of the linking boards of each folding group is a curved board.

11. The folding device for baby carriage as claimed in claim 10, wherein each one of the elongated slots of each folding group has a width formed between two adjacent pivot boards, and the width of the elongated slot is narrower than 5 millimeters.

12. The folding device for baby carriage as claimed in claim 10, wherein each one of the elongated slots of each folding group has a width formed between two adjacent pivot boards, and the width of the elongated slot is wider than 12 millimeters.

* * * * *